stance, is closest to a reference distance, determining it to be the distance between the moving object and the right side feature and the distance between the moving object and the left side feature, for the current location.

US011663808B2

(12) United States Patent
Tateishi et al.

(10) Patent No.: US 11,663,808 B2
(45) Date of Patent: May 30, 2023

(54) DISTANCE ESTIMATING DEVICE AND STORAGE MEDIUM STORING COMPUTER PROGRAM FOR DISTANCE ESTIMATION

(71) Applicant: TOYOTA JIDOSHA KABUSHIKI KAISHA, Toyota (JP)

(72) Inventors: Kojiro Tateishi, Tokyo-to (JP); Kazushi Tanaka, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 17/160,761

(22) Filed: Jan. 28, 2021

(65) Prior Publication Data

US 2021/0237768 A1    Aug. 5, 2021

(30) Foreign Application Priority Data

Jan. 30, 2020    (JP) .............................. JP2020-014050

(51) Int. Cl.
 *G06V 10/44*    (2022.01)
 *B60W 60/00*    (2020.01)
 (Continued)

(52) U.S. Cl.
 CPC ........... *G06V 10/44* (2022.01); *B60W 60/001* (2020.02); *G06F 18/213* (2023.01);
 (Continued)

(58) Field of Classification Search
 CPC ............ G06K 9/6232; B60W 2552/53; B60W 2554/4049
 See application file for complete search history.

(56) References Cited

U.S. PATENT DOCUMENTS

2018/0349712 A1*   12/2018   Kumano .............. G06V 20/588
2019/0147253 A1*    5/2019   Bai ........................ G08G 1/167
                                            382/103
2019/0259179 A1     8/2019   Suzuki

FOREIGN PATENT DOCUMENTS

JP        2017059003 A      3/2017
JP        2018013956 A      1/2018
JP        2018206071 A     12/2018

OTHER PUBLICATIONS

"LIDAR-Based Lane Marking Detection For Vehicle Positioning in an HD Map" F. Ghallabi et al, 201 21st International Conference on Intelligent Transportation Systems (ITSC) Maui, Hawaii, USA, Nov. 4-7, 2018. pp 2209-2214 (Year: 2018).*

(Continued)

Primary Examiner — Peter D Nolan
Assistant Examiner — Tanya C Sienko
(74) Attorney, Agent, or Firm — Dickinson Wright, PLLC

(57) ABSTRACT

A distance estimating device has a processor configured to calculate first and second right side distances between a moving object and a right side feature and first and second left side distances between the moving object and a left side feature, determine a reference feature-to-feature distance between the right and left side feature at the current location, and estimate a right side and left side distance combination, where the feature-to-feature distance between a right left side feature obtained for each combination of first right side distance corrected by an estimation error or second right side distance and first left side distance corrected by an estimation error or second left side distance, is closest to a reference distance, determining it to be the distance between the moving object and the right side feature and the distance between the moving object and the left side feature, for the current location.

5 Claims, 9 Drawing Sheets

(51) Int. Cl.
*G06V 20/56* (2022.01)
*G06F 18/213* (2023.01)
*G06V 10/764* (2022.01)
*G06V 10/82* (2022.01)

(52) U.S. Cl.
CPC ............ *G06V 10/764* (2022.01); *G06V 10/82* (2022.01); *G06V 20/588* (2022.01); *B60W 2552/53* (2020.02); *B60W 2554/4049* (2020.02)

(56) References Cited

OTHER PUBLICATIONS

"Precise Localization of a Vehicle within a Driving Lane by Combining the Vehicle Trajectory with Vision Information" by I. Weon et al., 2016 16th International Conference on Control, Automation and Systems (ICCAS 2016) pp. 1010-1015 (Year: 2016).*
"Lane Endpoint Detection and Position Accuracy Evaluation for Sensor Fusion-Based Vehicle Localization on Highways" E.S. Jang et al., Sensors 2018, 4389 (Year: 2018).*

* cited by examiner

| FIRST<br>RIGHT SIDE DISTANCE | | FIRST<br>LEFT SIDE DISTANCE |
|---|---|---|
| SECOND<br>RIGHT SIDE DISTANCE |  | SECOND<br>LEFT SIDE DISTANCE |
| THIRD<br>RIGHT SIDE DISTANCE | | THIRD<br>LEFT SIDE DISTANCE |

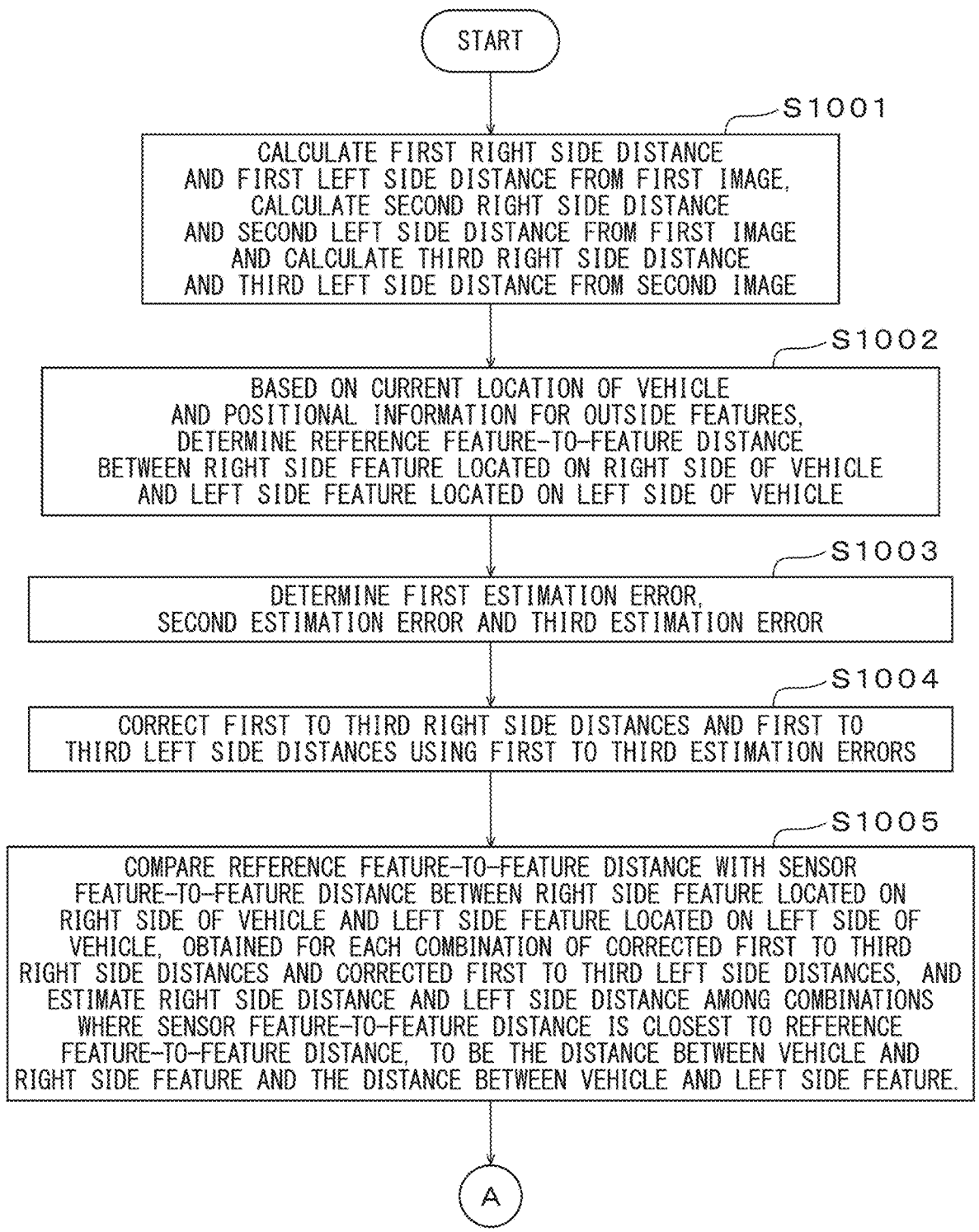

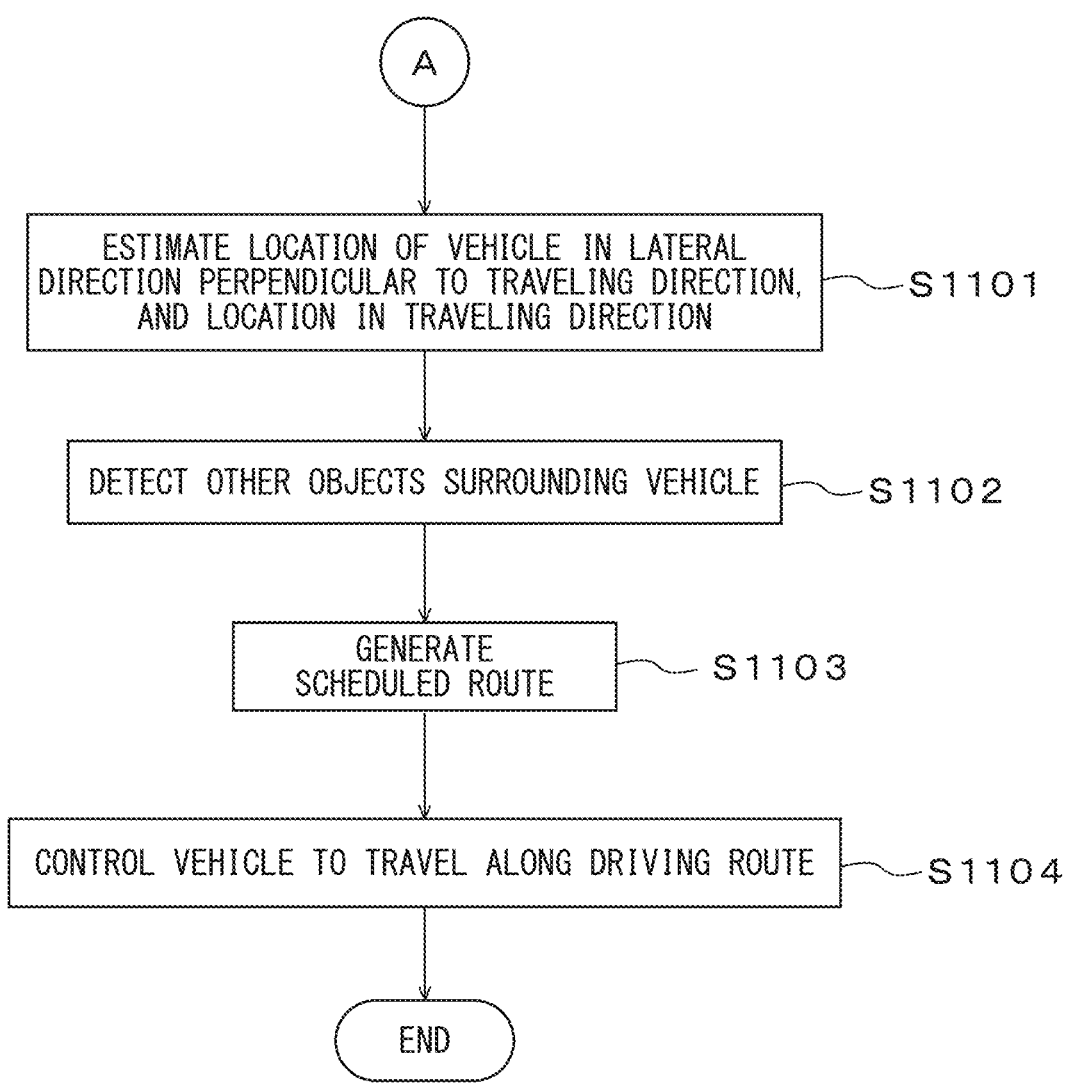

DISTANCE ESTIMATING DEVICE AND STORAGE MEDIUM STORING COMPUTER PROGRAM FOR DISTANCE ESTIMATION

FIELD

The present invention relates to a distance estimating device and to a storage medium that stores a computer program for distance estimation.

BACKGROUND

Methods for estimating vehicle locations are being studied for use in support of vehicle operation and self-driving control.

A camera mounted in a vehicle is used to take an image in front of the vehicle, lane marking lines in the image are recognized, and the location of the vehicle is determined in relation to the lane marking lines on the left and right, to estimate the location of the vehicle on the road in the lateral direction perpendicular to the traveling direction.

For example, the division line-recognizing device described in Japanese Unexamined Patent Publication No. 2017-59003 has a laser range finder that acquires information for the left side of the vehicle, a laser range finder that acquires information for the right side of the vehicle, a traffic lane width calculator that calculates the traffic lane width as the space between division lines on the left and right of the vehicle, a memory that stores the vehicle width, and a division line assessment unit that assesses whether or not a candidate left division line detected by a left division line location calculating unit and a candidate right division line detected by a right division line location calculating unit are division lines to the left and right of the vehicle, based on the distance from the vehicle to the candidate left division line, the distance from the vehicle to the candidate right division line, the vehicle width and the traffic lane width. The division line assessment unit assesses whether or not the candidate division lines to the left and right of the vehicle are division lines for the traffic lane in which the vehicle is traveling, for each combination of a plurality of division lines on the left side and a plurality of division lines on the right side of the vehicle.

SUMMARY

The location (for example, height) and orientation of the laser range finder mounted on the vehicle is predetermined, and the installation location information including the optical axis direction and mounting position of the laser range finder, and the measurement results from the laser range finder, are used to calculate the distance from the vehicle to the candidate division lines on the left and right.

However, since the height and orientation of the vehicle varies depending on the number of people riding in the vehicle, or the weight of luggage loaded in the trunk, the location or orientation of the sensor mounted on the vehicle can also vary. The mounting operation can also potentially lead to error in the location or orientation of the laser range finder or other sensors mounted on the vehicle.

When the location and orientation of a sensor mounted on the vehicle changes with respect to the installation location information, there is a risk that the correct distance from the vehicle to the candidate left and right division lines may not be calculable when the installation location information is used to calculate those distances.

It is therefore an object of the present invention to provide a distance estimating device that can correctly estimate the distance between a moving object and outside features surrounding the moving object.

One embodiment of the invention provides a distance estimating device. The distance estimating device has a memory that stores positional information representing the locations of outside features, and a processor. The processor is configured to calculate a first right side distance between a moving object and a right side feature located on the right side of the moving object. The processor calculates a first left side distance between the moving object and a left side feature located on the left side of the moving object, from first region data representing outside features within a first predetermined region surrounding the moving object, acquired using a first sensor mounted on the moving object. The processor calculates a second right side distance between a moving object and a right side feature located on the right side of the moving object and a second left side distance between the moving object and a left side feature located on the left side of the moving object, from second region data that includes information representing outside features within a second predetermined region surrounding the moving object, acquired using a second sensor mounted on the moving object. The processor determines a reference feature-to-feature distance for the current location, between the right side feature located on the right side of the moving object and the left side feature located on the left side of the moving object, based on the current location of the moving object. The current location of the moving object is determined by a locating unit that locates the current location of the moving object and positional information for the outside features stored in the memory. The processor determines a first estimation error for a first feature-to-feature distance, which is the sum of the first right side distance and the first left side distance, based on the difference between the first feature-to-feature distance and the reference feature-to-feature distance. The processor uses the first estimation error to correct the first right side distance and the first left side distance, and make a comparison between the reference feature-to-feature distance and a sensor feature-to-feature distance between the right side feature located on the right side of the moving object and the left side feature located on the left side of the moving object. These are obtained for each combination of either the corrected first right side distance or second right side distance and the corrected first left side distance or second left side distance, estimating the right side distance and left side distance among the combinations where the sensor feature-to-feature distance is closest to the reference feature-to-feature distance, to be the distance between the moving object and the right side feature and the distance between the moving object and the left side feature, at the current location.

In this distance estimating device, the processor is preferably configured to input the difference between a past series of first feature-to-feature distances and reference feature-to-feature distances, into a prediction filter to determine an estimation error for the first feature-to-feature distance at the current time.

The processor of the distance estimating device is also preferably configured to determine the reliability of the first right side distance, the reliability of the first left side distance, the reliability of the second right side distance and the reliability of the second left side distance. These are determined based on previous estimate results and, for each combination of the first right side distance corrected using the first estimation error or second right side distance and the first left side distance corrected using the first estimation error or second left side distance. The processor calculates an evaluation value which increases as the sum of the reliability of the right side distance and the reliability of the left side distance among those combinations increases and as the difference between the sensor feature-to-feature distance and the reference feature-to-feature distance decreases, estimating the right side distance and left side distance among the combinations where the evaluation value is maximum, to be the distance between the moving object and the right side feature and the distance between the moving object and the left side feature, at the current location.

In this distance estimating device, the time at which the first region data is acquired by the first sensor and the time at which the second region data is acquired by the second sensor are preferably matching.

According to another embodiment, a computer readable non-transitory storage medium is provided which stores a computer program for distance estimation. The computer readable non-transitory storage medium stores a computer program for distance estimation. The computer program can be executed causing the processor to calculate a first right side distance between a moving object and a right side feature located on the right side of the moving object and a first left side distance between the moving object and a left side feature located on the left side of the moving object. The calculation is made from first region data representing outside features within a first predetermined region surrounding the moving object, acquired using a first sensor mounted on the moving object. The computer program can be executed to cause the processor to calculate a second right side distance between the moving object and the right side feature located on the right side of the moving object and a second left side distance between the moving object and the left side feature located on the left side of the moving object. The calculation is made from second region data that includes information representing outside features within a second predetermined region surrounding the moving object, acquired using a second sensor mounted on the moving object. The processor is programmed to determine a reference feature-to-feature distance between the right side feature located on the right side of the moving object and the left side feature located on the left side of the moving object, for the current location, based on the current location of the moving object determined by a locating unit. The locating unit that acquires the current location of the moving object and positional information for the outside feature stored in the memory that stores positional information for outside features. The processor is programmed to determine a first estimation error for a first feature-to-feature distance, which is the sum of the first right side distance and the first left side distance, based on the difference between the first feature-to-feature distance and the reference feature-to-feature distance. The processor is programmed to use the first estimation error to correct the first right side distance and the first left side distance, and to make a comparison between the reference feature-to-feature distance and a sensor feature-to-feature distance between the right side feature located on the right side of the moving object and the left side feature located on the left side of the moving object. These are obtained for each combination of either the corrected first right side distance or second right side distance and the corrected first left side distance or second left side distance, estimating the right side distance and left side distance among the combinations where the sensor feature-to-feature distance is closest to the reference feature-to-feature distance, to be the distance between the moving object and the right side feature and the distance between the moving object and the left side feature, at the current location.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 is an operation flow chart for a vehicle control system, which includes distance estimation processing (1).

FIG. 11 is an operation flow chart for a vehicle control system, which includes distance estimation processing (2).

DESCRIPTION OF EMBODIMENTS

Figure 1:
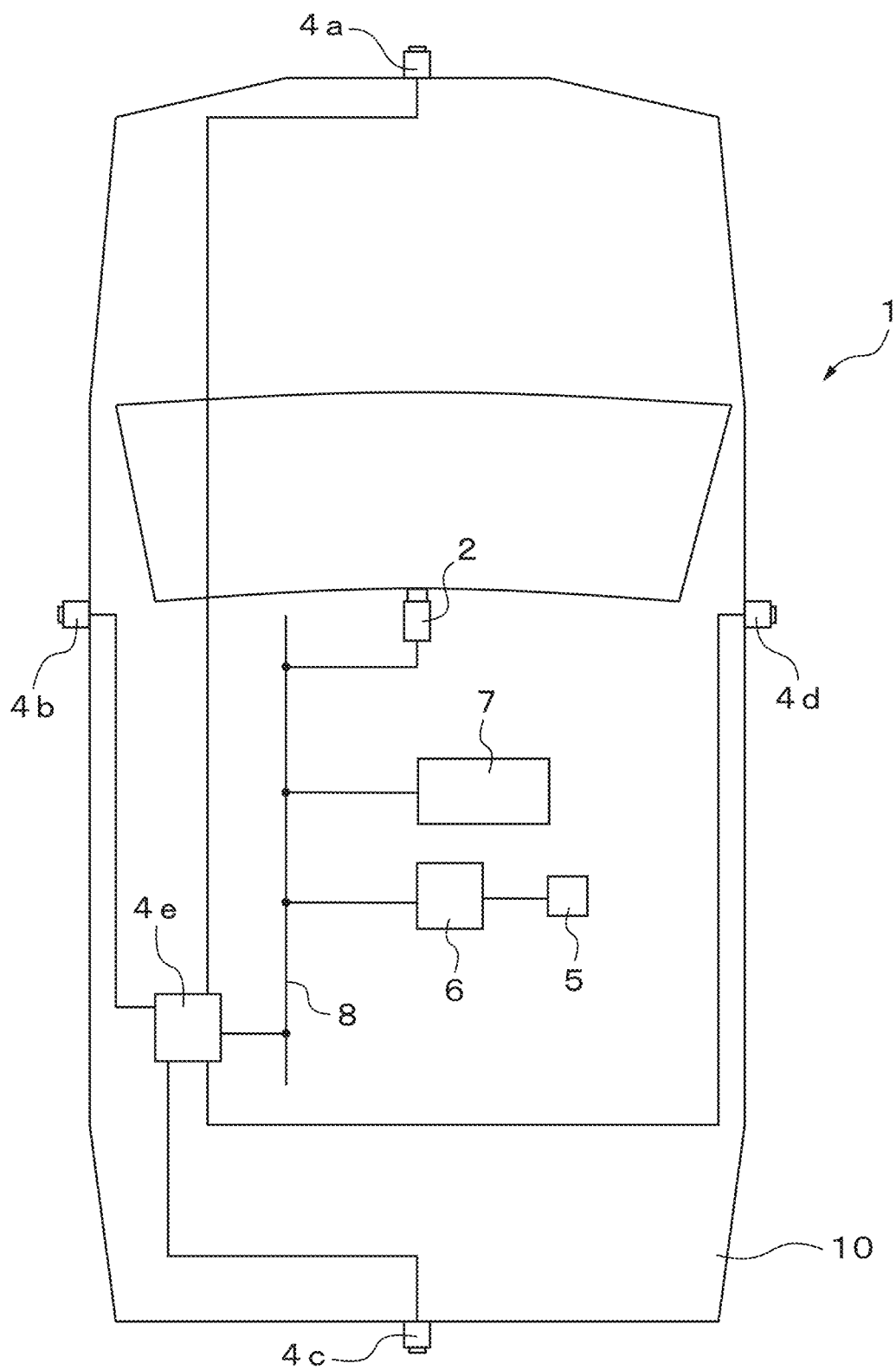
FIG. 1 is a general schematic drawing of a vehicle control system equipped with a distance estimating device.

The distance estimating device will now be described with reference to the accompanying drawings. The distance estimating device calculates a first right side distance between a moving object and a right side feature located on the right side of the moving object, and a first left side distance between the moving object and a left side feature located on the left side of the moving object, using first region data representing outside features within a first predetermined region surrounding the moving object that has been acquired using a first sensor such as a camera mounted on the moving object. The distance estimating device also calculates a second right side distance between the moving object and the right side feature located on the right side of the moving object, and a second left side distance between the moving object and the left side feature located on the left side of the moving object, using second region data representing outside features within a second predetermined region surrounding the moving object that has been acquired using a second sensor mounted on the moving object. The first sensor and second sensor may be the same or different. When the first sensor and second sensor are the same, the distance estimating device preferably calculates the second right side distance using a different algorithm from that for the first right side distance. The distance estimating device also determines a reference feature-to-feature distance, between the right side feature located on the right side of the moving object and the left side feature located on the left side of the moving object, for the current location, based on the current location of the moving object determined by a locating unit that acquires the current location of the moving object, and positional information representing the location of an outside feature stored in the memory. The current location of the moving object is, for example, the location of the moving object at an image acquisition time at which an image has been acquired, as an example of first region data representing outside features within a first predetermined region surrounding the moving object acquired using the first sensor such as a camera. The distance estimating device further determines a first estimation error for the first feature-to-feature distance, based on the difference between the reference feature-to-feature distance and the first feature-to-feature distance, as the sum of the first right side distance and the first left side distance. The distance estimating device compares the reference feature-to-feature distance with a sensor feature-to-feature distance, between the right side feature located on the right side of the moving object and the left side feature located on the left side of the moving object, obtained for each combination of either the first right side distance that has been corrected using the first estimation error, or the second right side distance, and the first left side distance that has been corrected using the first estimation error, or the second left side distance, and estimates the right side distance and left side distance among the combinations where the sensor feature-to-feature distance is closest to the reference feature-to-feature distance, to be the distance between the moving object and the right side feature and the distance between the moving object and the left side feature, for the current location. Even in the case of an error in the mounting position or orientation of the sensor such as a camera on the moving object, the distance estimating device can correct for the error in the location or orientation of the sensor to correctly estimate the distance between the moving object and outside features such as left and right lane marking lines of the traffic lane in which the moving object is traveling.

The distance estimating device will now be described as an example being applied in a vehicle control system. For this example, the distance estimating device carries out distance estimation processing based on region data (for example, an image) acquired using a sensor such as a camera mounted on the vehicle, to estimate the right side distance between the vehicle and a right side feature and the left side distance between the vehicle and a left side feature, for the traffic lane in which the vehicle is traveling. The distance estimating device also estimates the location of the vehicle in the traffic lane, based on the estimated left side distance and right side distance from the vehicle, and generates an operation plan for the vehicle based on the estimated location, utilizing it for vehicle operation control. The technical scope of the invention is not limited to this embodiment, however, and includes the invention and its equivalents as laid out in the Claims.

Figure 2:
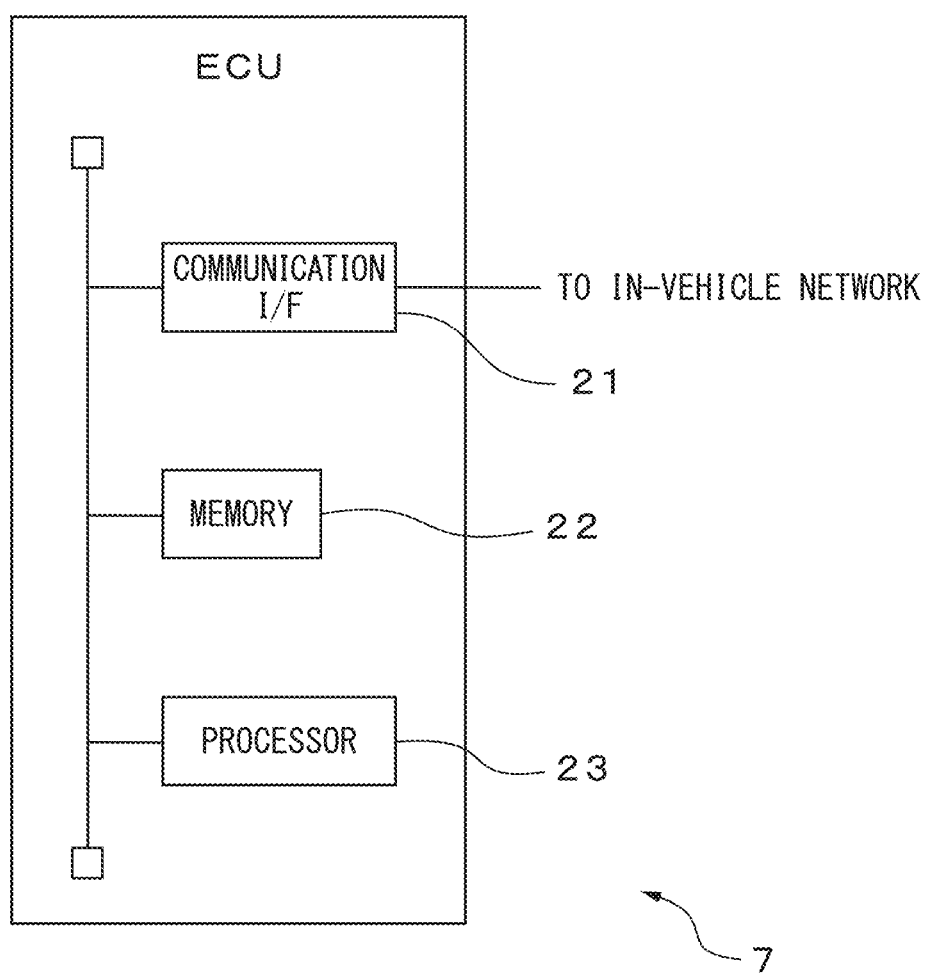
FIG. 2 is a hardware configuration diagram of an electronic control unit as an embodiment of the distance estimating device.

FIG. 1 is a general schematic drawing of a vehicle control system equipped with a distance estimating device. FIG. 2 is a hardware configuration diagram of an electronic control unit as an embodiment of the distance estimating device.

For this embodiment, the vehicle control system 1 that is mounted in the vehicle 10 and controls the vehicle 10 has a first camera 2 that takes a forward image of the vehicle. The vehicle control system 1 has second cameras 4a to 4d that acquire images toward the front and rear and left and right of the vehicle 10, and a camera image processing unit 4e that processes the images taken by the second cameras 4a to 4d.

The vehicle control system 1 also comprises a positioning information receiver 5, and a map information storage device 6 that stores wide-area map information for a predetermined range and, based on positioning information output by the positioning information receiver 5, outputs map information for a region including the current location represented by the positioning information. The vehicle control system 1 comprises an electronic control unit (ECU) 7, as an example of a distance estimating device. The vehicle 10 also has a wireless communication device (not shown), and can communicate with an external server through a base station by wireless communication via the wireless communication device.

The first camera 2, second cameras 4a to 4d, camera ECU 4e, map information storage device 6 and ECU 7 are connected in a communicable manner via an in-vehicle network 8 conforming to the Controller Area Network standard.

The first camera 2 generates a first image of a region ahead of the vehicle, as an example of region data containing information representing the locations of outside features within a predetermined region ahead of the vehicle 10, at an image data acquisition time set within a predetermined cycle. The generated first image shows outside features such as road surface lane marking lines that are within the predetermined region ahead of the vehicle 10. The first image produced by the first camera 2 may be a color image or a gray image. The first camera 2 is an example of an imaging unit, and it has a 2D detector composed of an array of photoelectric conversion elements with visible light sensitivity, such as a CCD or C-MOS, and an imaging optical system that forms an image of the photographed region on the 2D detector. The first camera 2 is mounted inside the compartment of the vehicle 10 and directed toward the front of the vehicle 10.

The first camera 2 outputs the first image and the image data acquisition time at which the first image was acquired, through the in-vehicle network 8 to the ECU 7, each time a first image is generated. At the ECU 7, the first image is used for distance estimation processing and processing to estimate the location of the vehicle, as well as for processing to detect objects around the vehicle 10.

The second cameras 4a to 4d generate second images, as examples of region data containing information representing the locations of outside features within predetermined regions ahead, to the left, behind and to the right of the vehicle 10, at an image data acquisition time set with the same predetermined cycle and at the same time as the first camera 2, and output them to the camera image processing unit 4e. The second cameras 4a to 4d are examples of imaging units, and they each have a 2D detector composed of an array of photoelectric conversion elements with visible light sensitivity, such as a CCD or C-MOS, and an imaging optical system that forms an image of the photographed region on the 2D detector. The second cameras 4a to 4d are mounted at the front, rear, left and right of the vehicle 10 and directed toward the front, left, rear and right of the vehicle 10. The images obtained by the second cameras 4a to 4d may be color images or gray images.

The camera image processing unit 4e includes a processor (not shown). The processor combines the images produced by the second cameras 4a to 4d to produce a composite image of the surrounding of the vehicle 10. The processor of the camera image processing unit 4e also generates second camera information that includes the left and right images generated by the second cameras 4b, 4d. The processor of the camera image processing unit 4e outputs the second camera information and the image data acquisition time at which the second camera information was acquired, together with the composite image, through the in-vehicle network 8 to the ECU 7, for each second camera information generated. The second camera information is used for distance estimation processing at the ECU 7. The composite image in which the area around the vehicle 10 is visible is used at the ECU 7 for processing to determine the relative positional relationship with other objects around the vehicle 10.

The positioning information receiver 5 acquires positioning information that represents the current location of the vehicle 10. The positioning information receiver 5 may be a GPS receiver, for example. The positioning information receiver 5 outputs positioning information and the positioning information acquisition time at which the positioning information has been acquired, to the map information storage device 6 each time positioning information is acquired at a predetermined receiving cycle.

The map information storage device 6 has a processor (not shown) and a storage device (not shown) such as a magnetic disk drive or a non-volatile semiconductor memory, the storage device storing wide-area map information for a wide area that includes the current location of the vehicle 10 (for example, a range of several square kilometers). The wide-area map information is preferably high precision map information including information for the types and locations of structures or outside features such as road lane marking lines. The locations of road outside features and structures are represented by the world coordinate system, with a predetermined reference location in real space as the origin. The processor of the map information storage device 6 receives the wide-area map information from an external server via a base station, by wireless communication through a wireless communication device, in relation to the current location of the vehicle 10, and stores it in the storage device. With reference to the wide-area map information stored in the memory, the processor of the map information storage device 6 outputs the map information for a narrow area including the current location represented by the positioning information (for example, an area of several tens to several hundreds of square meters) and the time at which the positioning information was acquired, via the in-vehicle network 8 to the ECU 7, each time positioning information is input from the positioning information receiver 5. The map information storage device 6 is an example of a memory that stores positional information for outside features.

The ECU 7 controls the vehicle 10. For this embodiment, the ECU 7 determines the right side distance between the vehicle 10 and the right side feature and the left side distance between the vehicle and the left side feature, based on the first image etc., output by the first camera 2. The ECU 7 also estimates the location of the vehicle in the traffic lane based on the right side distance and left side distance, and controls the vehicle 10 for self-driving of the vehicle 10. For this purpose, the ECU 7 has a communication interface 21, a memory 22 and a processor 23, as shown in FIG. 2.

The communication interface 21 is an example of a communication unit, and it has an interface circuit to connect the ECU 7 with the in-vehicle network 8. Specifically, the communication interface 21 is connected with the first camera 2 and map information storage device 6, for example, via the in-vehicle network 8. Each time information of a first image is received from the first camera 2, for example, the communication interface 21 passes the received information to the processor 23. Each time positioning information, a positioning information acquisition time and map information are received from the map information storage device 6, the communication interface 21 passes the received positioning information, positioning information acquisition time and map information to the processor 23. The communication interface 21 passes the vehicle speed and yaw rate, received from a vehicle speed sensor and yaw rate sensor (not shown), to the processor 23.

The memory 22 is an example of a memory unit, and it has a volatile semiconductor memory and a non-volatile semiconductor memory, for example. The memory 22 stores various data to be used in distance estimation processing carried out by the processor 23 of the ECU 7, such as installation location information including the optical axis direction and mounting position of each camera, and internal parameters such as the focal length and viewing angle of the imaging optical system. The memory 22 also stores the first image and other images received from the first camera 2 and other cameras, and the positioning information, the time the positioning information was acquired, and the map information, received from the map information storage device 6.

The processor 23 is an example of a controller, and it comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 also carries out distance estimation processing in which the right side distance between the vehicle and a right side feature and the left side distance between the vehicle and a left side feature are estimated each time a first image or second camera information are input. The processor 23 estimates the location of the vehicle in the traffic lane at the image data acquisition time, based on the estimated left side distance and right side distance. The processor 23 also estimates the location of the vehicle 10 at the positioning time, based on the location of the vehicle 10 at the preceding image data acquisition time, the vehicle speed and the yaw rate, the positioning time being set with a shorter predetermined cycle than the image data acquisition time. The processor 23 also controls the vehicle 10 based on the relative positional relationship between the estimated location of the vehicle 10 and other objects around the vehicle 10, so that it makes the vehicle 10 self-driving.

Figure 3:
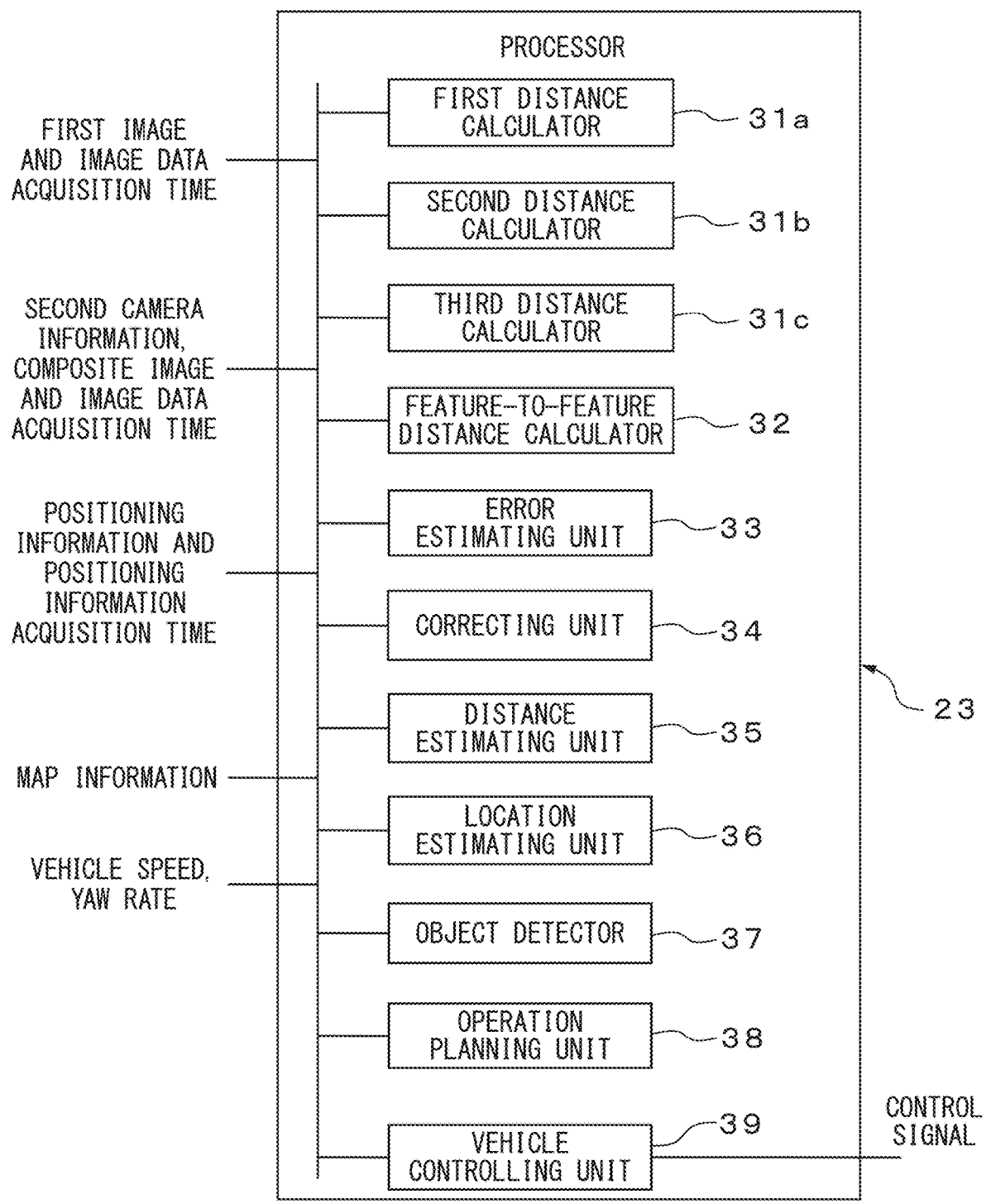
FIG. 3 is a functional block diagram of a processor of an electronic control unit, as it relates to vehicle control processing that includes a distance estimating device.

FIG. 3 is a functional block diagram of the processor 23 of the ECU 7, as it relates to vehicle control processing that includes distance estimation processing. The processor 23 comprises a first distance calculator 31a, a second distance calculator 31b, a third distance calculator 31c, a feature-to-feature distance calculator 32, an error estimating unit 33, a correcting unit 34, a distance estimating unit 35, a location estimating unit 36, an object detector 37, an operation planning unit 38 and a vehicle controlling unit 39. Each of the units of the processor 23 are functional modules driven by a computer program operating on the processor 23, for example. Alternatively, each of the units of the processor 23 may be specialized computing circuits in the processor 23. Among the units of the processor 23, the first to third distance calculators 31a to 31c, the feature-to-feature distance calculator 32, the error estimating unit 33 and the distance estimating unit 35 carry out distance estimation processing.

From the first image, the first distance calculator 31a estimates a first right side distance between the vehicle 10 and the right side lane marking line located on the right side of the vehicle 10, and a first left side distance between the vehicle 10 and the left side lane marking line located on the left side of the vehicle 10. The first distance calculator 31a first detects multiple candidate points representing lane marking lines, as examples of outside features, from the first image. The first distance calculator 31a may also detect multiple candidate points within a predetermined matching area region in the first image. For example, the first distance calculator 31a may apply an edge detection filter such as a Sobel filter to the first image to detect edge pixels, and it may detect pixels having brightness above a predetermined threshold value among the detected pixels, as candidate points. The first distance calculator 31a may also detect candidate points in the image by inputting the image into a discriminator, for example. The discriminator may use a deep neural network (DNN) that has been trained to detect lane marking lines in input images, for example. The first distance calculator 31a detects pixels in a region of the first image identified to be a lane marking line, as candidate points. The positional information for the candidate points can be represented in an image coordinate system with an $xi$ axis extending to the right and a $y_i$ axis extending downward, using the location at the top left corner of the first image as the origin, for example.

The first distance calculator 31a represents the coordinates for the candidate points represented in the image coordinate system, in a vehicle coordinate system where the vehicle 10 is the origin. The vehicle coordinate system has the midpoint between left and right rear wheels of the vehicle 10 and above the ground as the origin, with the traveling direction of the vehicle 10 as the zv axis, the direction perpendicular to the zv axis and parallel to the ground as the xv axis, and the vertical direction as the yv axis. First, the first distance calculator 31a carries out viewpoint conversion processing on the coordinates of candidate points represented on the image coordinate system, using information such as the installation location information and internal parameters of the first camera 2, representing the coordinates of the candidate points on the camera coordinate system. In the camera coordinate system, the center of the imaging surface is the origin, the zc axis is the traveling direction of the vehicle 10, the xc axis is the direction perpendicular to the zc axis and parallel to the ground, and the yc axis is the vertical direction. The candidate points representing the lane marking lines on the ground photographed by the first camera 2 are assumed to be the locations on the ground, with a fixed yc coordinate. The first distance calculator 31a converts the coordinates of the candidate points from the image coordinate system to the vehicle coordinate system. The conversion formula from the image coordinate system to the vehicle coordinate system is represented as a combination between a rotation matrix representing rotation within the coordinate system and a translation vector representing parallel movement within the coordinate system. The first distance calculator 31a notifies the second distance calculator 31b of the coordinates of the candidate points represented in the vehicle coordinate system, together with the image data acquisition time at which the first image was acquired.

Figure 4:
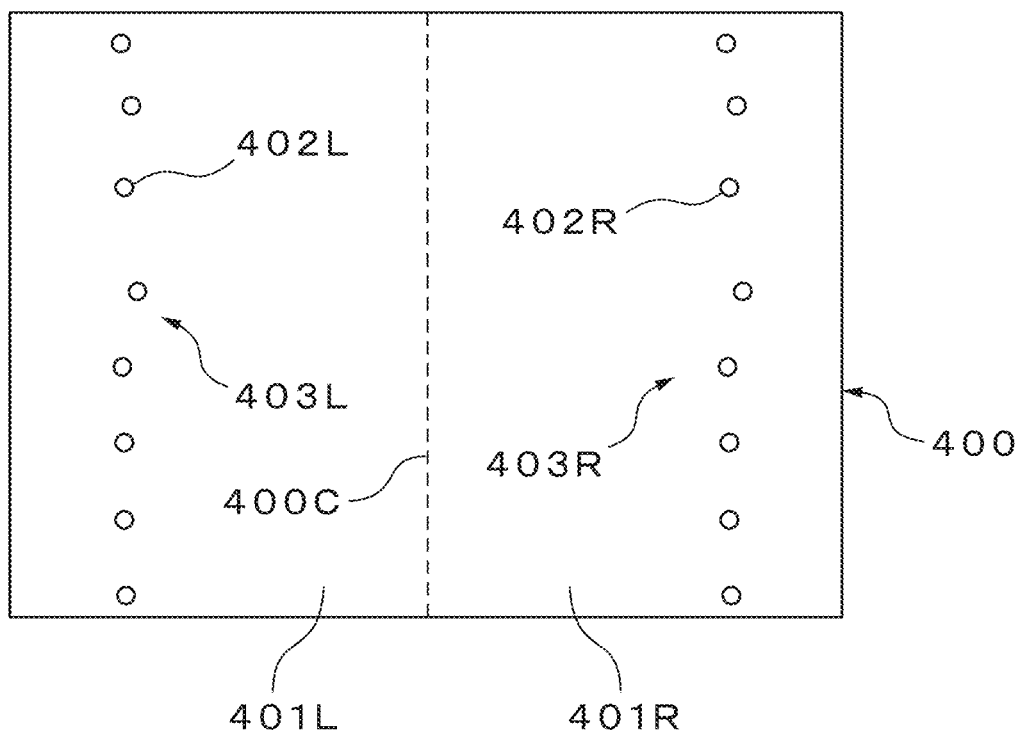
FIG. 4 is a diagram illustrating processing by a first distance calculator.

FIG. 4 shows a first image 400 that includes candidate points 402R, 402L represented in the vehicle coordinate system. The first distance calculator 31a divides the first image 400 into a right side region 401R and a left side region 401L by a center line 400c which is the projection components on the imaging surface of the zv axis of the vehicle coordinate system. The right side region 401R has a right side candidate point group 403R that includes multiple candidate points 402R. The left side region 401L has a left side candidate point group 403L that includes multiple candidate points 402L.

When the lane marking lines of the first image have thus been detected as a candidate point group, it is expected that lane marking lines corresponding to complex shapes such as road branches or merges can be detected from the first image.

The first distance calculator 31a estimates the location and traveling direction of the vehicle 10 at the image data acquisition time, based on the location of the vehicle 10 at the previous positioning time notified by the location estimating unit 36, and the amount of movement and moving direction of the vehicle 10 during the time between the previous positioning time and the image data acquisition time. The first distance calculator 31a calculates the amount of movement and moving direction of the vehicle 10 during the time between the previous positioning time and the image data acquisition time, based on the vehicle speed and yaw rate that were notified during that time. The first distance calculator 31a performs time-integration of the speed of the vehicle 10 to determine the amount of movement of the vehicle 10 between the previous positioning time and the image data acquisition time, and time-integration of the yaw rate of the vehicle 10 to determine the moving direction, as the amount of change in declination of the vehicle 10 between the positioning time and the image data acquisition time. The first distance calculator 31a estimates an assumed location and assumed posture of the first camera 2 at the image data acquisition time, using information such as the installation location information and internal parameters of the first camera 2, and the estimated location and moving direction of the vehicle 10. The first distance calculator 31a notifies the feature-to-feature distance calculator 32 of the image data acquisition time.

The first distance calculator 31a also uses the right side candidate point group to calculate the first right side distance between the vehicle 10 and the right side lane marking line located on the right side of the vehicle 10. First, the first distance calculator 31a represents the map information in a predetermined region including the assumed location of the vehicle 10 at the image data acquisition time, on the vehicle coordinate system. The first distance calculator 31a then projects the right side candidate point group onto a map represented by the map information, and calculates the degree of coincidence between the lane marking lines around the vehicle 10 represented in the map, and the right side candidate point group. The first distance calculator 31a may also calculate the number of candidate points (number of inliers) among a right side candidate point group included around the lane marking lines, as the degree of coincidence. The first distance calculator 31a carries out processing such as the location conversion of the right side candidate point group from the image coordinate system to the vehicle coordinate system as described above, and calculation of the degree of coincidence with the right side candidate point group, while varying the assumed location and assumed posture by a predetermined amount, to calculate the degree of coincidence between the lane marking lines around the vehicle 10 which are represented in the map information and right side candidate point group, for each of a plurality of assumed locations and assumed postures. The first distance calculator 31a identifies the assumed location and assumed posture where the degree of coincidence is maximal, and based on the assumed location and assumed posture of the first camera 2, estimates the location and traveling direction of the vehicle 10 at the image data acquisition time at which the image was taken by the first camera 2. The first distance calculator 31a calculates the first right side distance between the location of the vehicle 10 and the right side lane marking line at the image data acquisition time, based on the location of the vehicle 10 and the location of the right side lane marking lines on the map. The first distance calculator 31a may determine the location of the vehicle 10 to be the location that is the both the center of the lateral direction, as the direction perpendicular to the traveling direction of the vehicle 10, and the center in the traveling direction of the vehicle 10. The first right side distance is the distance between the location of the vehicle 10 and the right side lane marking line, in the lateral direction that is perpendicular to the traveling direction of the vehicle 10.

Similarly, the first distance calculator 31a uses the left side candidate point group created in the region on the left side of the first image to calculate the first left side distance between the vehicle 10 and the left side lane marking line located on the left side of the vehicle 10. The first left side distance is the distance between the location of the vehicle 10 and the left side lane marking line, in the lateral direction that is perpendicular to the traveling direction of the vehicle 10. The first distance calculator 31a notifies the error estimating unit 33 and distance estimating unit 35 of the first right side distance and first left side distance, together with the image data acquisition time at which the first image was acquired. The first distance calculator 31a may also notify the distance estimating unit 35 of the traveling direction of the vehicle 10 at the image data acquisition time at which the first image was acquired.

Figure 5:
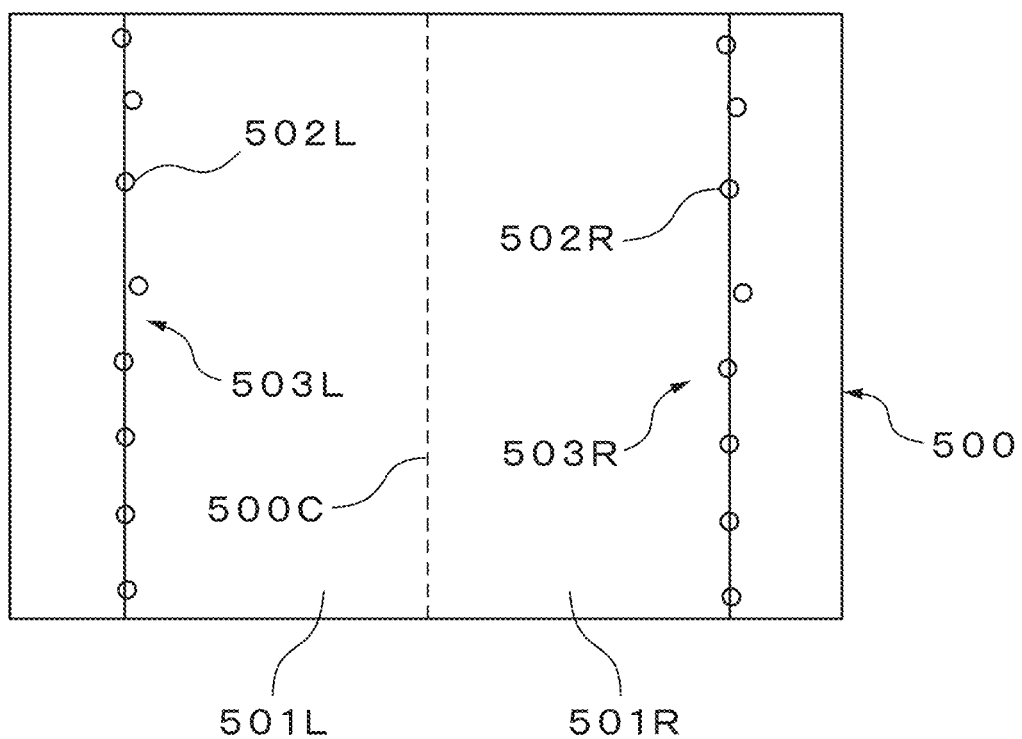
FIG. 5 is a diagram illustrating processing by a second distance calculator.

Using a different algorithm than the first distance calculator 31a, the second distance calculator 31b calculates a second right side distance between the vehicle 10 and the right side lane marking line located on the right side of the vehicle 10, and a second left side distance between the vehicle 10 and the left side lane marking line located on the left side of the vehicle 10, from the first image at the image data acquisition time. The second distance calculator 31b creates a right side detection line based on a candidate point group detected in the region on the right side of the first image, among the candidate points notified from the first distance calculator 31a. The second distance calculator 31b also creates a left side detection line based on a candidate point group detected in the region on the left side of the first image, among the candidate points notified from the first distance calculator 31a. FIG. 5 is a diagram showing the right side detection line and left side detection line. FIG. 5 shows a first image 500 that includes candidate points 502R, 502L represented in the vehicle coordinate system. The first image 500 is divided into a right side region 501R and a left side region 501L by a center line 500c, as the projection components on the imaging surface of the zv axis of the vehicle coordinate system. The second distance calculator 31b applies a Hough transform, for example, on a candidate point group that includes candidate points 502R located on the right side region 501R, to produce a right side detection line 503R. The second distance calculator 31b applies a Hough transform, for example, on a candidate point group that includes candidate points 502L located on the left side region 501L, to produce a left side detection line 503L.

When the lane marking lines of the first image have been detected as detection lines, as with the second distance calculator 31b, this reduces detection of non-lane marking lines as lane marking lines. However, when the lane marking lines of the first image have been detected as a candidate point group, as with the first distance calculator 31a, dotted noise may be detected as candidate points, thus potentially resulting in detection of non-lane marking lines as lane marking lines. Detection of lane marking lines from the first image as detection lines will often have lower precision for detection of complex shapes such as road branches or merges, compared to detection of lane marking lines from the first image as a candidate point group. The ECU 7 therefore detects outside features such as lane marking lines by utilizing the respective advantages of both the first distance calculator 31a that detects lane marking lines as a candidate point group and the second distance calculator 31b that detects lane marking lines as detection lines.

The second distance calculator 31b uses the right side detection line 503R to calculate the second right side distance between the vehicle 10 and the right side lane marking line located on the right side of the vehicle 10. The second distance calculator 31b calculates the second right side distance based on the number of pixels on the first image 500 situated between the center line of the vehicle 10 and the right side lane marking line. The second distance calculator 31b likewise uses the left side detection line 503L to calculate the second left side distance between the vehicle 10 and the left side lane marking line located on the left side of the vehicle 10. The second distance calculator 31b notifies the error estimating unit 33 and distance estimating unit 35 of the second right side distance and second left side distance, together with the image data acquisition time at which the first image was acquired. Incidentally, the second distance calculator 31b may also calculate the second right side distance and second left side distance by calculating the degree of coincidence between the right side detection line 503R and left side detection line 503L, and the lane marking lines around the vehicle 10 represented on the map information, based on the same processing used to calculate the first right side distance and first left and right side distances by the first distance calculator 31a.

Figure 6A:
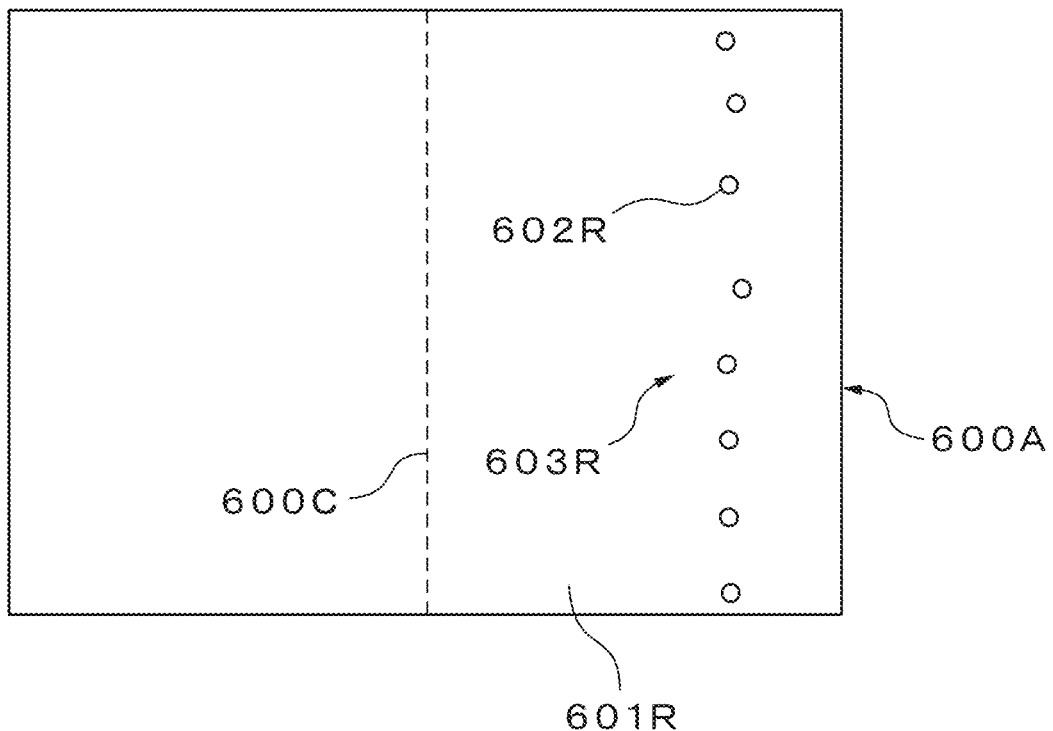
FIG. 6A is a diagram illustrating processing by a third distance calculator.
Figure 6B:
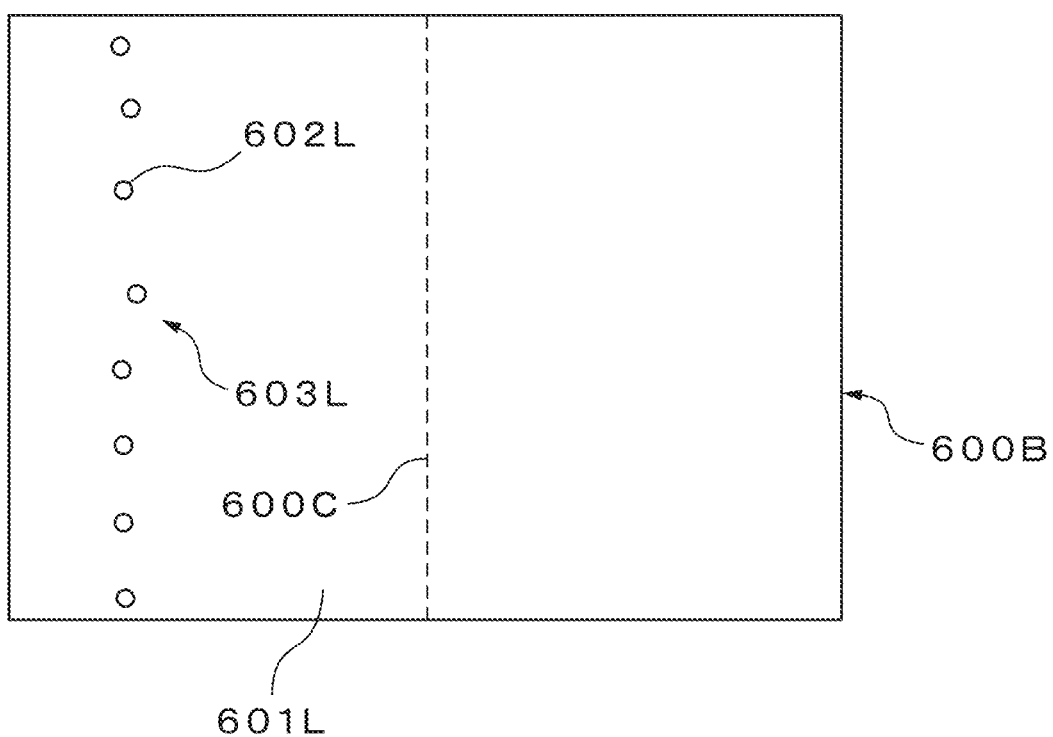
FIG. 6B is a diagram illustrating processing by a third distance calculator.

The third distance calculator 31c calculates the third right side distance and third left side distance based on the second camera information. The third distance calculator 31c calculates the third right side distance based on an image produced by the second camera 4d in the second camera information (hereunder referred to as "third image A"). FIG. 6A shows a third image 600A that includes candidate points 602R represented in the vehicle coordinate system. The third image 600A includes a right side region 601R with respect to a center line 600c, as a projection component on the imaging surface of the zv axis of the vehicle coordinate system. The right side region 601R has a right side candidate point group 603R that includes multiple candidate points 602R. The third distance calculator 31c may also calculate the third right side distance based on the same processing as for calculation of the first right side distance by the first distance calculator 31a. The third right side distance is calculated based on an image produced by a second camera 4d that is a different sensor from the first camera 2 used for calculation of the first right side distance, and that has a different mounting position. The third distance calculator 31c also calculates the third left side distance based on an image produced by the second camera 4b in the second camera information (hereunder referred to as "third image B"). FIG. 6B shows a third image 600B that includes candidate points 602L represented in the vehicle coordinate system. The third image 600B includes a left side region 601L with respect to a center line 600c, as a projection component on the imaging surface of the zv axis of the vehicle coordinate system. The left side region 601L has a left side candidate point group 603L that includes multiple candidate points 602L. The third distance calculator 31c may also calculate the third left side distance based on the same processing as for calculation of the first left side distance by the first distance calculator 31a. The third left side distance is calculated based on an image produced by a second camera 4b that is a different sensor from the first camera 2 used for calculation of the first left side distance, and that has a different mounting position. The third distance calculator 31c notifies the error estimating unit 33 and distance estimating unit 35 of the third right side distance and third left side distance, together with the image data acquisition time at which the second camera image was acquired.

The ECU 7 uses a second distance calculator 31b that uses a different algorithm from the first distance calculator 31a and first distance calculator 31a, and a third distance calculator 31c that calculates distance using different sensor measurement results and a different algorithm, to calculate the distances between the vehicle 10 and both the right side lane marking line and left side lane marking line. The ECU 7 determines the sensor feature-to-feature distance between the right side lane marking line and the left side lane marking line, for each combination of right side distance and left side distance calculated by one of the first distance calculator 31a to third distance calculator 31c. As explained below, the ECU 7 selects a combination of right side distance and left side distance having a sensor feature-to-feature distance closest to the reference feature-to-feature distance. This will presumably allow estimation of the most accurate combination of right side distance and left side distance.

The feature-to-feature distance calculator 32 calculates a reference feature-to-feature distance as the distance between the right side lane marking line located on the right side of the vehicle 10 and the left side lane marking line located on the left side of the vehicle 10, at the image data acquisition time for which notification has been given by the first distance calculator 31a, based on positioning information determined by the positioning information receiver 5 and map information input from the map information storage device 6. The feature-to-feature distance calculator 32 estimates the location of the vehicle 10 at the image data acquisition time for which notification has been given by the first distance calculator 31a, based on the positioning information determined by the positioning information receiver 5. When positioning information exists that has been acquired at a time matching the image data acquisition time, the feature-to-feature distance calculator 32 estimates the location of the vehicle 10 at the image data acquisition time using the positioning information acquired at the time matching the image data acquisition time. When positioning information acquired at a time matching the image data acquisition time does not exist, on the other hand, the feature-to-feature distance calculator 32 estimates the location of the vehicle 10 at the image data acquisition time using positioning information acquired at a time before or after the image data acquisition time. The feature-to-feature distance calculator 32 uses the location of the vehicle 10 at the image data acquisition time and the map information, to identify the traffic lane in which the vehicle 10 is traveling at the image data acquisition time, and determines the reference feature-to-feature distance to be the distance between the two adjacent lane marking lines delineating the identified traffic lane. The feature-to-feature distance calculator 32 may also determine the reference feature-to-feature distance to be the distance between intersecting points where a straight line perpendicular to both of the two adjacent lane marking lines intersects with the lane marking lines. The feature-to-feature distance calculator 32 notifies the error estimating unit 33 and distance estimating unit 35 of the reference feature-to-feature distance. The feature-to-feature distance calculator 32 also notifies the location estimating unit 36 of the location of the vehicle 10 at the image data acquisition time, estimated based on the positioning information.

The error estimating unit 33 determines a first estimation error for the first feature-to-feature distance, based on the difference between the reference feature-to-feature distance and the first feature-to-feature distance, as the sum of the first right side distance and the first left side distance notified from the first distance calculator 31a. The error estimating unit 33 also determines a second estimation error for the second feature-to-feature distance, based on the difference between the reference feature-to-feature distance and the second feature-to-feature distance, as the sum of the second right side distance and the second left side distance notified from the second distance calculator 31b. The error estimating unit 33 still further determines a third estimation error for the third feature-to-feature distance, based on the difference between the reference feature-to-feature distance and the third feature-to-feature distance, as the sum of the third right side distance and the third left side distance notified from the third distance calculator 31c.

A mounting location (such as height) and orientation are set in advance as the location and orientation of each sensor such as the first camera 2 to be mounted on the vehicle 10. The mounting operation of the sensor on the vehicle 10, however, can potentially lead to error in the mounting position or orientation. Since the height or orientation of the vehicle 10 varies depending on the number of people riding in the vehicle 10, or the weight of luggage loaded in the trunk, the location or orientation of the sensor mounted on the vehicle 10 can also vary. As a result, the location or orientation of the sensor mounted on the vehicle 10 may vary with respect to the installation location information for the sensor.

Figure 7:
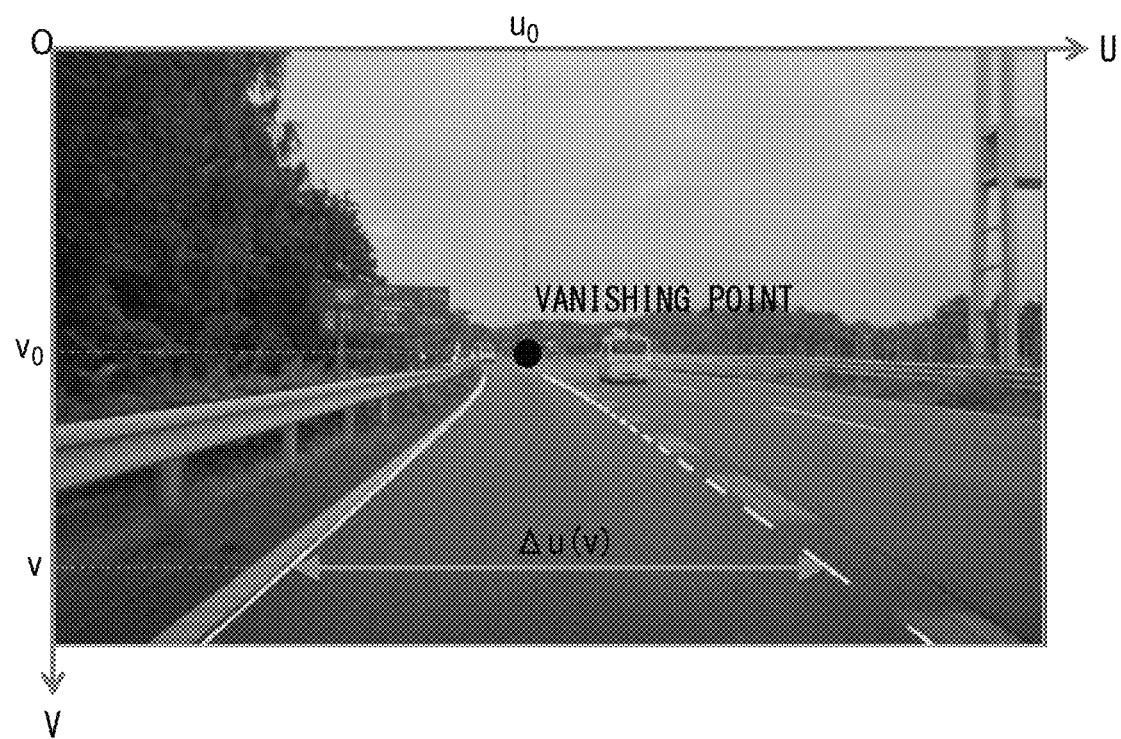
FIG. 7 is a diagram illustrating processing by an error estimating unit (1).

The following explanation refers to FIG. 7, for a case where error exists in the height of the first camera 2 mounted on the vehicle 10, producing error in the spacing between two adjacent lane marking lines as calculated based on an image taken by the first camera 2.

The height of the first camera 2 mounted on the vehicle 10 is designed as Y, and the coordinates of the vanishing point in the image taken by the first camera 2 are $(u_0, v_0)$ in the image coordinate system. The locations of the pixels on the image are represented as coordinates in the image coordinate system. The spacing $\Delta xi$ between the two lane marking lines delineating the traffic lane in which the vehicle 10 is traveling in the image varies depending on the location on the Yi axis, and it is therefore represented as $\Delta u(v)$.

The spacing between the two adjacent lane marking lines, Wobs1, is represented by the following formula (1).

$$\text{Wobs1} = \Delta u(v) \cdot Y/(v - v_0) \tag{1}$$

When an error $\Delta Y$ exists in the height of the first camera 2 mounted on the vehicle 10, the spacing between the two adjacent lane marking lines, Wobs2, is represented by the following formula (2).

$$\text{Wobs2} = \Delta u(v) \cdot (Y + \Delta Y)/(v - v_0) \tag{2}$$

The error in the spacing between the two adjacent lane marking lines due to the error $\Delta Y$ in the height of the first camera 2 mounted on the vehicle 10, is represented by the following formula (3).

$$\Delta e = \text{Wobs2} - \text{Wobs1} = \Delta u(v) \cdot Y/(v - v_0) \tag{3}$$

Thus, when a fixed error ΔY is produced in the height Y of the first camera 2 mounted on the vehicle 10, a fixed error Δe is also produced in the spacing calculated for the two adjacent lane marking lines. For the same reason, error is also produced in the first right side distance as the distance between the vehicle 10 and the right side lane marking line, and the first left side distance as the distance between the vehicle 10 and the left side lane marking line.

The ECU 7 therefore estimates the error for each distance calculator using the error estimating unit 33, and corrects the error for the right side distance and the left side distance calculated by each distance calculator, and then uses the corrected right side distance and left side distance to determine the sensor feature-to-feature distance.

The error estimating unit 33 inputs the difference between the reference feature-to-feature distance and the first feature-to-feature distance, as the sum of the first right side distance and first left side distance for a past series of image acquisition times, into a prediction filter, and determines the first estimation error for the first feature-to-feature distance at the current image acquisition time. The prediction filter used may be a Kalman filter, for example. The error estimating unit 33 notifies the correcting unit 34 of the first estimation error.

Figure 8:
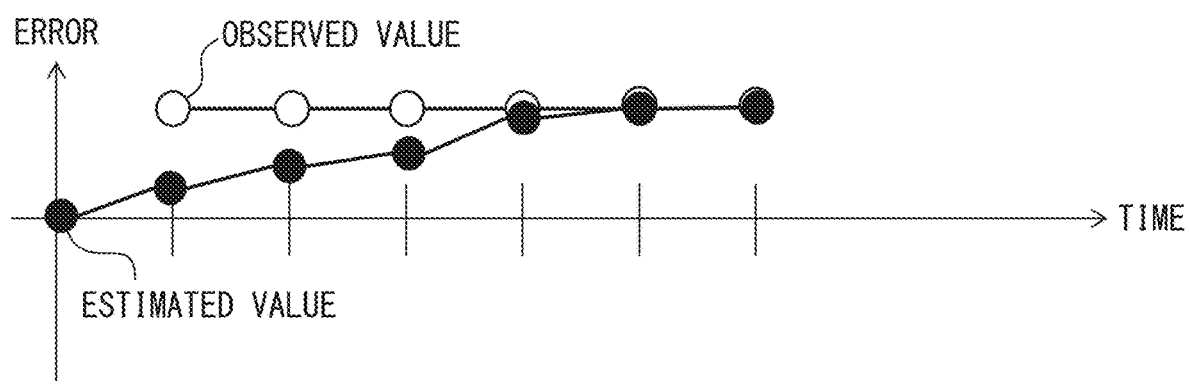
FIG. 8 is a diagram illustrating processing by an error estimating unit (2).

FIG. 8 shows how the estimated value for error in a first feature-to-feature distance, as an estimate output by a prediction filter, gradually approaches true error with elapsing estimation processing time.

The error estimating unit 33 similarly inputs the difference between the reference feature-to-feature distance and the second feature-to-feature distance, as the sum of the second right side distance and second left side distance for a past series of image acquisition times, into a prediction filter, and determines the second estimation error for the second feature-to-feature distance at the current image acquisition time. The error estimating unit 33 notifies the correcting unit 34 of the second estimation error. The error estimating unit 33 likewise inputs the difference between the reference feature-to-feature distance and the third feature-to-feature distance, as the sum of the third right side distance and third left side distance for a past series of image acquisition times, into a prediction filter, and determines the third estimation error for the third feature-to-feature distance at the current image acquisition time. The error estimating unit 33 notifies the correcting unit 34 of the third estimation error.

The correcting unit 34 uses the first estimation error to correct the first right side distance and first left side distance. For example, the correcting unit 34 subtracts half of the value of the estimation error for the first feature-to-feature distance from the first right side distance, to calculate the corrected first right side distance. Similarly, the error estimating unit 33 subtracts half of the value of the estimation error for the first feature-to-feature distance from the first left side distance, to calculate the corrected first left side distance. The error estimating unit 33 notifies the distance estimating unit 35 of the corrected first right side distance and the corrected first left side distance.

Similarly, the correcting unit 34 uses the second estimation error to correct the second right side distance and second left side distance, and uses the third estimation error to correct the third right side distance and third left side distance. The correcting unit 34 notifies the distance estimating unit 35 of the corrected second right side distance and the corrected second left side distance, and of the corrected third right side distance and the corrected third left side distance.

The error estimating unit 33 preferably determines the estimation error for at least one of the feature-to-feature distances from among the first feature-to-feature distance to third feature-to-feature distance, but it does not need to determine an estimation error for all of the feature-to-feature distances.

The distance estimating unit 35 compares the reference feature-to-feature distance with the sensor feature-to-feature distance, between the right side lane marking line located on the right side of the vehicle 10 and the left side lane marking line located on the left side of the vehicle 10, obtained for each combination of any corrected first right side distance to third right side distance and any corrected first left side distance to third left side distance. The distance estimating unit 35 also estimates the right side distance and left side distance among the combinations where the sensor feature-to-feature distance is closest to the reference feature-to-feature distance, to be the distance between the vehicle 10 and the right side lane marking line and the distance between the vehicle 10 and the left side lane marking line at the location at the image data acquisition time. The distance estimating unit 35 notifies the location estimating unit 36 of the distance between the vehicle 10 and the right side lane marking line and the distance between the vehicle 10 and the left side lane marking line at the image data acquisition time.

Figure 9:
FIG. 9 is a diagram illustrating processing by a distance estimating unit.

FIG. 9 is a diagram illustrating combinations of each right side distance and each left side distance. In the example shown in FIG. 9, the distance estimating unit 35 carries out comparison with the reference feature-to-feature distance, for each of the 9 combinations of sensor feature-to-feature distances. The distance estimating unit 35 determines the difference between the reference feature-to-feature distance and the sensor feature-to-feature distance obtained with the combination of first right side distance and first left side distance. The distance estimating unit 35 also determines the difference between the reference feature-to-feature distance and the sensor feature-to-feature distance obtained with the combination of first right side distance and second left side distance. The distance estimating unit 35 also determines the difference between the reference feature-to-feature distance and the sensor feature-to-feature distance obtained with the combination of first right side distance and third left side distance. In the same manner, the distance estimating unit 35 determines the difference between the reference feature-to-feature distance and the sensor feature-to-feature distances obtained with each of the combinations of second right side distance with the first left side distance to third left side distance. The distance estimating unit 35 also determines the difference between the reference feature-to-feature distance and the sensor feature-to-feature distances obtained with each of the combinations of third right side distance with the first left side distance to third left side distance. The distance estimating unit 35 estimates a right side distance among combinations with the smallest absolute values for the difference between the sensor feature-to-feature distance and the reference feature-to-feature distance, to be the distance between the vehicle 10 and the right side lane marking line at the location at the image data acquisition time. The distance estimating unit 35 also estimates a left side distance among combinations with the smallest absolute values for the difference between the sensor feature-to-feature distance and the reference feature-to-feature distance, to be the distance between the vehicle 10 and the left side lane marking line at the location at the image data acquisition time.

The location estimating unit 36 estimates the location in the lateral direction, which is the direction perpendicular to the traveling direction of the vehicle 10, and the location in the traveling direction of the vehicle 10, at the image data acquisition time. The location estimating unit 36 estimates the location in the lateral direction of the vehicle 10 at the image data acquisition time, using the distance between the vehicle 10 and the right side lane marking line and the distance between the vehicle 10 and the left side lane marking line. The location estimating unit 36 also estimates the location in the traveling direction of the vehicle 10 at the image data acquisition time, using the location of the vehicle 10 at the image data acquisition time notified from the feature-to-feature distance calculator 32. Incidentally, the location estimating unit 36 may also estimate the location in the traveling direction of the vehicle 10 at the image data acquisition time by matching outside features such as road signs in the image produced by the first camera 2, with outside features on the map.

In addition, at a positioning time set with a predetermined cycle that is shorter than the image data acquisition time, the location estimating unit 36 estimates the location of the vehicle 10 at the positioning time, based on the estimated location of the vehicle 10 (location in the traveling direction and lateral direction) at the immediately preceding image data acquisition time, and the amount of movement and moving direction of the vehicle 10 between the positioning time and the image data acquisition time. The location estimating unit 36 calculates the amount of movement and moving direction of the vehicle 10 during the time between the previous positioning time and the image data acquisition time, based on the vehicle speed and yaw rate that were input during that time.

The object detector 37 detects other objects around the vehicle 10 based on both the first image and a composite image. The object detector 37 detects objects represented in the first image by inputting the first image into a discriminator, for example. The discriminator may use a deep neural network (DNN) that has been trained to detect objects represented in input images, for example. The object detector 37 used may also be a discriminator other than a DNN. For example, the discriminator used by the object detector 37 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the object detector 37 may detect an object region by template matching between the image and a template in which an object to be detected is represented. Similarly, the object detector 37 similarly detects objects represented in images based on the composite image. The object detector 37 may also track an object to be detected from an updated image, by matching objects detected in the updated image with objects detected in previous images, according to a tracking process based on optical flow. The object detector 37 may also estimate the relative speed of an object with respect to the vehicle 10, based on changes in the size of the object during tracking in images over elapsing time. The object detector 37 identifies identical objects among detected objects based on different images, and judges that objects identified as being the same are single objects. The object detector 37 notifies the operation planning unit 38 of information indicating the locations of detected objects. The object detector 37 may also detect other objects around the vehicle 10 based on measurement results from a sensor that acquires distance images, such as a LIDAR sensor.

The operation planning unit 38 acquires information indicating the location of the vehicle 10 at the positioning time and the locations of detected objects, and the map information. Based on this information, the operation planning unit 38 produces one or more scheduled routes for the vehicle 10. The scheduled route is represented as an aggregate of the target locations for the vehicle 10 for different times from the current time up to a predetermined time. The operation planning unit 38 estimates the relative positional relationship between the vehicle 10 and other objects, according to the positional relationship between the location of the vehicle 10, structures on the road represented in the map, and other detected objects. For example, the operation planning unit 38 identifies vehicle lanes in which other objects are moving, according to the positional relationship between traffic lanes represented in the map and other objects, and assesses whether or not the other objects and the vehicle 10 are traveling in the same lane. The operation planning unit 38 also assesses, for example, whether another object is traveling in a traffic lane defined by two mutually adjacent lane marking lines situated on either side of the center location of the other object in the lateral direction. Similarly, the operation planning unit 38 assesses whether the vehicle 10 is traveling in a traffic lane defined by two mutually adjacent lane marking lines situated on either side of the vehicle 10. The operation planning unit 38 further assesses whether or not the traffic lane in which the vehicle 10 is traveling is the same as the traffic lane in which another object is traveling. Since the space between two adjacent lane marking lines represented in the map is known and the internal parameters of the camera such as the focal length are also known, the distance from the vehicle 10 can be estimated by the space between the two adjacent lane marking lines on the image. The operation planning unit 38 can therefore estimate the distance from the vehicle 10 to another object based on the space between two adjacent lane marking lines represented in the map at the location of the other object on the image. The operation planning unit 38 thus estimates the relative positional relationship between the other object and the vehicle 10, by the positional relationship with structures on the road represented in the map. The operation planning unit 38 can therefore accurately estimate the relative positional relationship between other objects and the vehicle 10 even when outside features on the roads such as lane marking lines are not clearly visible in the image.

The operation planning unit 38 estimates the future trajectory of other detected object based on its current and past trajectories, and based on the traffic lane in which the other detected object is traveling and its relative distance, produces a scheduled route for the vehicle 10 so that either the other object and the vehicle 10 travel in different traffic lanes, or so that at least a predetermined distance is maintained for the relative distance from the vehicle 10 to the other object. The operation planning unit 38 may also produce multiple scheduled routes. In this case, the operation planning unit 38 may select the route among the multiple scheduled routes that minimizes the sum of absolute accelerations for the vehicle 10. The operation planning unit 38 notifies the vehicle controlling unit 39 of the produced scheduled routes.

The vehicle controlling unit 39 controls each unit of the vehicle 10 based on the location of the vehicle 10 at the image data acquisition time and positioning time and the vehicle speed and yaw rate, as well as on the notified scheduled route, so that the vehicle 10 travels along the notified scheduled route. For example, the vehicle controlling unit 39 determines the steering angle, acceleration and angular acceleration of the vehicle 10 according to the notified scheduled route and the current vehicle speed and yaw rate of the vehicle 10, and sets the amount of steering, and the accelerator or brake level so as to match that steering angle, acceleration and angular acceleration. The vehicle controlling unit 39 also outputs a control signal corresponding to a set steering amount, to an actuator (not shown) that controls the steering wheel for the vehicle 10. The vehicle controlling unit 39 also determines the amount of fuel injection according to a set accelerator level, and outputs a control signal corresponding to the amount of fuel injection to the engine fuel injector (not shown) of the vehicle 10. Alternatively, the vehicle controlling unit 39 may output a control signal corresponding to a set brake level to the brake (not shown) of the vehicle 10.

FIG. 10 and FIG. 11 are operation flow charts for vehicle control processing that includes distance estimation processing, carried out by the processor 23. The processor 23 carries out vehicle control processing according to the operation flow charts shown in FIG. 10 and FIG. 11, for each image data acquisition time set at a predetermined cycle. In the operation flow charts shown below, the processing of steps S1001 to S1005 corresponds to the distance estimation processing.

First, the first distance calculator 31a of the processor 23 calculates a first right side distance between the vehicle 10 and a right side feature located on the right side of the vehicle 10, and a first left side distance between the vehicle 10 and a left side feature located on the left side of the vehicle 10, from a first image representing outside features within a first predetermined region around the vehicle 10, acquired using a first camera 2 mounted on the vehicle 10 (step S1001). The second distance calculator 31b of the processor 23 calculates a second right side distance between the vehicle 10 and a right side feature located on the right side of the vehicle 10, and a second left side distance between the vehicle 10 and a left side feature located on the left side of the vehicle 10, from a first image representing outside features within a first predetermined region around the vehicle 10, acquired using a first camera 2 mounted on the vehicle 10. Also, the third distance calculator 31c of the processor 23 calculates a third right side distance between the vehicle 10 and a right side feature located on the right side of the vehicle 10, and a third left side distance between the vehicle 10 and a left side feature located on the left side of the vehicle 10, from images representing outside features within predetermined regions on the left and right sides around the vehicle 10, acquired using second cameras 4b, 4d mounted on the vehicle 10.

The feature-to-feature distance calculator 32 of the processor 23 determines a reference feature-to-feature distance, between the right side feature located on the right side of the vehicle 10 and the left side feature located on the left side of the vehicle 10, for the current location, based on the current location of the vehicle 10 determined by the locating unit that acquires the current location of the vehicle 10, and the positional information representing the locations of outside features stored in a map information storage device 6, as an example of a memory (step S1002).

The error estimating unit 33 of the processor 23 then determines a first estimation error for the first feature-to-feature distance, based on the difference between the reference feature-to-feature distance and the first feature-to-feature distance, as the sum of the first right side distance and the first left side distance (step S1003). The error estimating unit 33 of the processor 23 then determines a second estimation error for the second feature-to-feature distance, based on the difference between the reference feature-to-feature distance and the second feature-to-feature distance, as the sum of the second right side distance and the second left side distance. The error estimating unit 33 of the processor 23 also determines a third estimation error for the third feature-to-feature distance, based on the difference between the reference feature-to-feature distance and the third feature-to-feature distance, as the sum of the third right side distance and the third left side distance.

The correcting unit 34 of the processor 23 then uses a first estimation error to correct the first right side distance and first left side distance, uses a second estimation error to correct the second right side distance and second left side distance, and uses a third estimation error to correct the third right side distance and third left side distance (step S1004).

The distance estimating unit 35 of the processor 23 then compares the reference feature-to-feature distance with the sensor feature-to-feature distance, between the right side feature located on the right side of the vehicle 10 and the left side feature located on the left side of the vehicle 10, obtained for each combination of any corrected first right side distance to third right side distance and any corrected first left side distance to third left side distance, and estimates the right side distance and left side distance among the combinations where the sensor feature-to-feature distance is closest to the reference feature-to-feature distance, to be the distance between the vehicle 10 and the right side feature and the distance between the vehicle 10 and the left side feature, for the current location (step S1005).

The location estimating unit 36 of the processor 23 then estimates the location in the lateral direction, which is the direction perpendicular to the traveling direction of the vehicle 10, and the location in the traveling direction of the vehicle 10, at the image data acquisition time (step S1101).

Next, the object detector 37 of the processor 23 detects other objects around the vehicle 10 based on an image produced by the first camera 2 (step S1102).

The operation planning unit 38 of the processor 23 then creates a scheduled route for the vehicle 10 based on the location of the vehicle 10, on information indicating the location of detected objects, and on map information (step S1103).

The vehicle controlling unit 39 of the processor 23 then controls each unit of the vehicle 10 based on the location of the vehicle 10, and the vehicle speed and yaw rate, as well as on the scheduled route, so that it travels along the scheduled route (step S1104).

As already explained, the distance estimating device calculates a first right side distance between a moving object and a right side feature located on the right side of the moving object, and a first left side distance between the moving object and a left side feature located on the left side of the moving object, from first region data representing outside features within a first predetermined region surrounding the moving object that has been acquired using a first sensor such as a camera mounted on the moving object. The distance estimating device also calculates second and third right side distances between a moving object and a right side feature located on the right side of the moving object, and second and third left side distances between the moving object and a left side feature located on the left side of the moving object, using the first region data, and region data representing outside features within a predetermined region surrounding the moving object that has been acquired using a different algorithm or a sensor different from the first sensor. The distance estimating device also determines a reference feature-to-feature distance, between the right side feature located on the right side of the moving object and the left side feature located on the left side of the moving object, for the current location, based on the current location of the moving object determined by a locating unit that acquires the current location of the moving object, and positional information for the outside feature stored in the memory. The distance estimating device further determines a first estimation error for the first feature-to-feature distance, based on the difference between the reference feature-to-feature distance and the first feature-to-feature distance, as the sum of the first right side distance and the first left side distance. Similarly, the distance estimating device determines second and third estimation errors for the second and third feature-to-feature distances, based on the difference between the reference feature-to-feature distance and the second and third feature-to-feature distances, as the sum of the second and third right side distances and the second and third left side distances. The distance estimating device compares the reference feature-to-feature distance with the sensor feature-to-feature distance, between the right side feature located on the right side of the moving object and the left side feature located on the left side of the moving object, obtained for each combination of first to third right side distances that have been corrected using the first to third estimation errors, and the first to third left side distances that have been corrected using the first to third estimation errors, and estimates the right side distance and left side distance among the combinations where the sensor feature-to-feature distance is closest to the reference feature-to-feature distance, to be the distance between the moving object and the right side feature and the distance between the moving object and the left side feature, for the location of the moving object at the image data acquisition time. Even in the case of error in the mounting position or orientation of the sensor such as a camera on the moving object, the distance estimating device can correct for the change in the location or orientation of the sensor to correctly estimate the distance between the moving object and outside features such as left and right lane marking lines of the traffic lane in which the moving object is traveling.

Another example will now be explained, in which the distance estimating unit 35 estimates the distance between the vehicle 10 and a right side lane marking line and the distance between the vehicle 10 and a left side lane marking line, for a location at the image data acquisition time.

Based on previous estimate results, the distance estimating unit 35 determines the reliability of the first right side distance, the reliability of the first left side distance, the reliability of the second right side distance and the reliability of the second left side distance, as well as the reliability of the third right side distance and the reliability of the third left side distance.

The distance estimating unit 35 may also calculate an evaluation value to be greater with a larger sum of the reliability of the right side distance and reliability of the left side distance, and with a smaller difference between the sensor feature-to-feature distance and the reference feature-to-feature distance, among combinations of the first right side distance to third right side distance and the first left side distance to third left side distance, and may estimate the right side distance and left side distance in the combination where the evaluation value is maximum, to be the distance between the vehicle 10 and the right side lane marking line and the distance between the vehicle 10 and the left side lane marking line for the current location at the image data acquisition time.

For example, the distance estimating unit 35 may determine the first reliability for each of the first right side distance to third right side distance based on the number of previous estimates for the distance between the vehicle 10 and the right side lane marking line. Similarly, the distance estimating unit 35 may determine the first reliability for each of the first left side distance to third left side distance based on the number of previous estimates for the distance between the vehicle 10 and the left side lane marking line. The distance estimating unit 35 may also determine the first reliability by summing the first reliabilities for any of the estimated first right side distance to third right side distance one at a time from the initial value, each time the distance between the vehicle 10 and the right side lane marking line is to be estimated. Similarly, the distance estimating unit 35 may determine the first reliability by summing the first reliabilities for any of the estimated first left side distance to third left side distance one at a time from the initial value, each time the distance between the vehicle 10 and the left side lane marking line is to be estimated. The distance estimating unit 35 assesses the reliability of the distance to be higher with a larger value for the first reliability.

The distance estimating unit 35 may also determine the second reliability for the first right side distance to third right side distance and the first left side distance to third left side distance based on the positional relationship between the optical axis direction of the camera and the sun. The distance estimating unit 35 estimates the optical axis direction of the first camera 2 using the installation location information for the first camera 2 and the location and traveling direction of the vehicle 10 at the image data acquisition time notified from the first distance calculator 31a. The distance estimating unit 35 also uses the image data acquisition time and information for calculating the location of the sun stored in the memory 22, to estimate the declination indicating the direction of the sun at the image data acquisition time, with the vehicle 10 as the center, on an Xw-Zw coordinate plane in the world coordinate system. In the world coordinate system, the origin is set at a predetermined point, the Xw and Zw axes are defined within a plane parallel to the ground, while the Yw axis is defined in the vertical direction. When the projection component obtained by projecting the optical axis direction of the first camera 2 onto the Xw-Zw coordinate plane is within a predetermined range with respect to the declination representing the direction of the sun, this means that the first camera 2 is facing the sun, and therefore the distance estimating unit 35 judges the second reliability for the first right side distance and first left side distance to be low. The distance estimating unit 35 may assess a value of 0.1, for example, for the second reliability of the first right side distance and first left side distance notified from the first distance calculator 31a. When the first camera 2 is not facing the sun, the distance estimating unit 35 may assess a value of 1.0, for example, for the second reliability of the first right side distance and first left side distance notified from the first distance calculator 31a. The distance estimating unit 35 determines the second reliability for the second to third right side distances and the second to third left side distances in the same manner. When the distance estimating unit 35 determines the reliability of the third right side distance and third left side distance notified from the third distance calculator 31d, it judges the second camera 4b or second camera 4d to be facing the sun if the projection component in the optical axis direction of either of the second camera 4b or second camera 4d is within a predetermined range with respect to the declination representing the direction of the sun.

The distance estimating unit 35 uses the first reliability, or the second reliability, or the sum of the first reliability and second reliability, to determine the third reliability for the right side distance and left side distance. The distance estimating unit 35 also determines the sum of the third reliability for the right side distance and the third reliability for the left side distance among each of the combinations of any of the first right side distance to third right side distance and any of the first left side distance to third left side distance.

The distance estimating unit 35 also determines the maximum distance (Dm) for the absolute value of the difference between the sensor feature-to-feature distance and reference feature-to-feature distance, for each combination of any of the first right side distance to third right side distance and any of the first left side distance to third left side distance. The distance estimating unit 35 also determines the ratio (Dm/Dc) of the absolute value for the difference between the sensor feature-to-feature distance and the reference feature-to-feature distance (Dc), with respect to the maximum Dm, for each combination of any of the first right side distance to third right side distance and any of the first left side distance to third left side distance. The distance estimating unit 35 determines an evaluation value, as the sum of the ratio (Dm/Dc) and the sum of the third reliability for the right side distance and the third reliability for the left side distance, among each of the combinations of any of the first right side distance to third right side distance and any of the first left side distance to third left side distance. The distance estimating unit 35 may also estimate the right side distance and left side distance among the combinations where the evaluation value is maximum, to be the distance between the vehicle 10 and the right side lane marking line and the distance between the vehicle 10 and the left side lane marking line at the current location at the image data acquisition time. The method by which the distance estimating unit 35 determines the evaluation value is not particularly restricted. The distance estimating unit 35 may determine the evaluation value by a method other than the one described above. When candidate points representing lane marking lines are detected using a deep neural network (DNN) that has been pre-trained to detect lane marking lines in images, the first distance calculator 31a may determine the reliability of the first right side distance and the reliability of the first left side distance, based on the average or maximum value for the reliability of pixels in the region that has been identified as the lane marking lines in the first image.

Another example of calculation of a reference feature-to-feature distance by the feature-to-feature distance calculator 32 will now be explained.

In the embodiment described above, the map information storage device 6, as an example of a memory, stored a map including positional information representing the locations of outside features such as lane marking lines, and the feature-to-feature distance calculator 32 calculated reference feature-to-feature distances based on the map stored in the memory. Instead of pre-storing positional information for outside features in a memory, however, the distance estimating unit 35 may store the estimated right side distance and left side distance in a memory with the relation to the location of the vehicle 10 at the image data acquisition time, each time the right side distance and left side distance are estimated. In this case, a constant value is stored in the memory as the initial value for the reference feature-to-feature distance. The feature-to-feature distance calculator 32 may also calculate the reference feature-to-feature distance using information stored in the memory.

The distance estimating device and storage medium that stores a computer program for distance estimation of the embodiment described above may incorporate appropriate modifications that are still within the gist of the invention.

For example, the region data for the embodiment described above had two-dimensional information as an image taken by a camera. However, the region data may also be a distance image representing outside features determined based on reflected waves reflected from the outside features on which electromagnetic waves such as a laser or millimeter waves have been irradiated. In this case, the region data will be three-dimensional information.

Moreover, in the embodiment described above, image data acquisition times at which images have been acquired by the first camera and image data acquisition times at which images have been acquired by the second cameras 4a to 4d, were matched with times at which positioning information has been acquired, but the times at which the image data acquisition times and positioning information are acquired may be different so long as they are within a period in which the widths of the two adjacent lane marking lines delineating the traffic lane in which the vehicle is traveling can be considered constant. The period during which the widths of the two adjacent lane marking lines can be considered constant will differ depending on the vehicle speed and lane marking line shapes, and each image data acquisition time may differ so long as the vehicle is traveling in straight lane marking lines and so long as the period is within a period of traveling in the traffic lane defined by the straight lines, for example. The shapes of the lane marking lines can be assessed based on map information.

Operation of the first to fourth distance calculators which determine the location of the vehicle in the lateral direction, as described above, is only one example, and the method by which the distance estimating device calculates the location of the vehicle in the lateral direction is not particularly restricted.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions and alterations could be made hereto without departing from the spirit and scope of the invention.

The invention claimed is:

1. A distance estimating device comprising:
   a memory that stores positional information representing locations of outside features, and
   a processor that is configured to:
   calculate a first right side distance between a moving object and a right side feature located on the right side of the moving object and a first left side distance between the moving object and a left side feature located on the left side of the moving object, from first region data representing the outside features within a first predetermined region surrounding the moving object, acquired using a first sensor mounted on the moving object,
   calculate a second right side distance between a moving object and the right side feature located on the right side of the moving object and a second left side distance between the moving object and a left side feature located on the left side of the moving object, from second region data that includes information representing the outside features within a second predetermined region surrounding the moving object, acquired using a second sensor mounted on the moving object, determine a reference feature-to-feature distance for a current location, between the right side feature located on the right side of the moving object and the left side feature located on the left side of the moving object, based on the current location of the moving object determined by a locating unit that locates the current location of the moving object and the positional information for the outside features stored in the memory, determine a first estimation error for a first feature-to-feature distance, which is the sum of the first right side distance and the first left side distance, based on the difference between the first feature-to-feature distance and the reference feature-to-feature distance, use the first estimation error to correct the first right side distance and the first left side distance, and make a comparison between the reference feature-to-feature distance and a sensor feature-to-feature distance between the right side feature located on the right side of the moving object and the left side feature located on the left side of the moving object, obtained for each combination of either the corrected first right side distance or second right side distance and the corrected first left side distance or second left side distance, estimating a right side distance and a left side distance among the combinations where the sensor feature-to-feature distance is closest to the reference feature-to-feature distance, to be the distance between the moving object and the right side feature and the distance between the moving object and the left side feature, at the current location.

2. The distance estimating device according to claim 1, wherein the processor is configured to input the difference between a past series of first feature-to-feature distances and a past series of reference feature-to-feature distances, into a prediction filter to determine the first estimation error for the first feature-to-feature distance at the current time.

3. The distance estimating device according to claim 1, wherein the processor is configured to:

determine the reliability of the first right side distance, the reliability of the first left side distance, the reliability of the second right side distance and the reliability of the second left side distance, based on previous estimate results and, for each combination of the first right side distance corrected using the first estimation error or second right side distance and the first left side distance corrected using the first estimation error or second left side distance, calculate an evaluation value which increases as the sum of the reliability of the right side distance and the reliability of the left side distance among those combinations increases and as the difference between the sensor feature-to-feature distance and the reference feature-to-feature distance decreases, estimating the right side distance and the left side distance among the combinations where the evaluation value is maximum, to be the distance between the moving object and the right side feature and the distance between the moving object and the left side feature, at the current location.

4. The distance estimating device according to claim 1, wherein a time at which the first region data is acquired by the first sensor and a time at which the second region data is acquired by the second sensor are matching.

5. A computer readable non-transitory storage medium storing a computer program for distance estimation, which causes a processor to:

calculate a first right side distance between a moving object and a right side feature located on the right side of the moving object and a first left side distance between the moving object and a left side feature located on the left side of the moving object, from first region data representing outside features within a first predetermined region surrounding the moving object, acquired using a first sensor mounted on the moving object, calculate a second right side distance between the moving object and the right side feature located on the right side of the moving object and a second left side distance between the moving object and the left side feature located on the left side of the moving object, from second region data that includes information representing outside features within a second predetermined region surrounding the moving object, acquired using a second sensor mounted on the moving object, determine a reference feature-to-feature distance for a current location of the moving object, between the right side feature located on the right side of the moving object and the left side feature located on the left side of the moving object, based on the current location of the moving object acquired by a locating unit that locates the current location of the moving object and positional information for the outside features stored in the memory, determine a first estimation error for a first feature-to-feature distance, which is the sum of the first right side distance and the first left side distance, based on the difference between the first feature-to-feature distance and the reference feature-to-feature distance, use the first estimation error to correct the first right side distance and the first left side distance, and make a comparison between the reference feature-to-feature distance and a sensor feature-to-feature distance between the right side feature located on the right side of the moving object and the left side feature located on the left side of the moving object, obtained for each combination of either the corrected first right side distance or second right side distance and the corrected first left side distance or second left side distance, estimating the right side distance and left side distance among the combinations where the sensor feature-to-feature distance is closest to the reference feature-to-feature distance, to be the distance between the moving object and the right side feature and the distance between the moving object and the left side feature, at the current location of the moving object.

\* \* \* \* \*